United States Patent [19]
Peruglia

[11] 3,808,449
[45] Apr. 30, 1974

[54] SAFETY DEVICE FOR PROTECTING HYDRAULIC CIRCUITS HAVING A BRANCH CIRCUIT

[75] Inventor: Marco Peruglia, Turin, Italy

[73] Assignee: Fiat Societa per Aziani, Turin, Italy

[22] Filed: July 12, 1972

[21] Appl. No.: 271,090

[30] Foreign Application Priority Data
July 20, 1971 Italy.................................. 69437/71

[52] U.S. Cl............. 307/10 R, 137/557, 180/82 R, 188/151 A, 340/52 C
[51] Int. Cl.............................................. B60t 11/10
[58] Field of Search............ 307/9, 10 R; 340/52 C, 340/53, 80, 136; 188/151 A, 1 A, 152; 180/82; 137/386, 400, 458, 551, 552.7, 557, 624.27, 598

[56] References Cited
UNITED STATES PATENTS

| | | | |
|---|---|---|---|
| 3,526,090 | 9/1970 | Reznicek | 188/151 A |
| 3,497,265 | 2/1970 | Vandermark | 188/151 A |

Primary Examiner—Robert K. Schaefer
Assistant Examiner—William J. Smith
Attorney, Agent, or Firm—Sughrue, Rothwell, Mion, Zinn & Macpeak

[57] ABSTRACT

A pressure sensitive safety circuit for an hydraulic installation, to protect the installation from faults occurring in a branch circuit thereof from which an auxiliary device may be operated. The safety circuit is pressure sensitive so that a connection between the main circuit and the branch circuit can be made if the pressure in the branch circuit is normal, but if the pressure in the branch circuit falls below normal, indicating a fault causing a loss of fluid, the branch circuit is isolated from the main circuit so that fluid is not lost from the main circuit. The safety device includes a control circuit having a timer switch and a pressure sensitive switch arranged in parallel in such a way that the timer allows operation for a predetermined short interval during which the pressure should have built up in the branch sufficient to operate the pressure sensitive switch whereupon the pressure switch takes over and the timer cuts out. If there is a fault the pressure switch does not operate and the control circuit switches off when the timer cuts out, to isolate the branch circuit from the main circuit.

5 Claims, 1 Drawing Figure

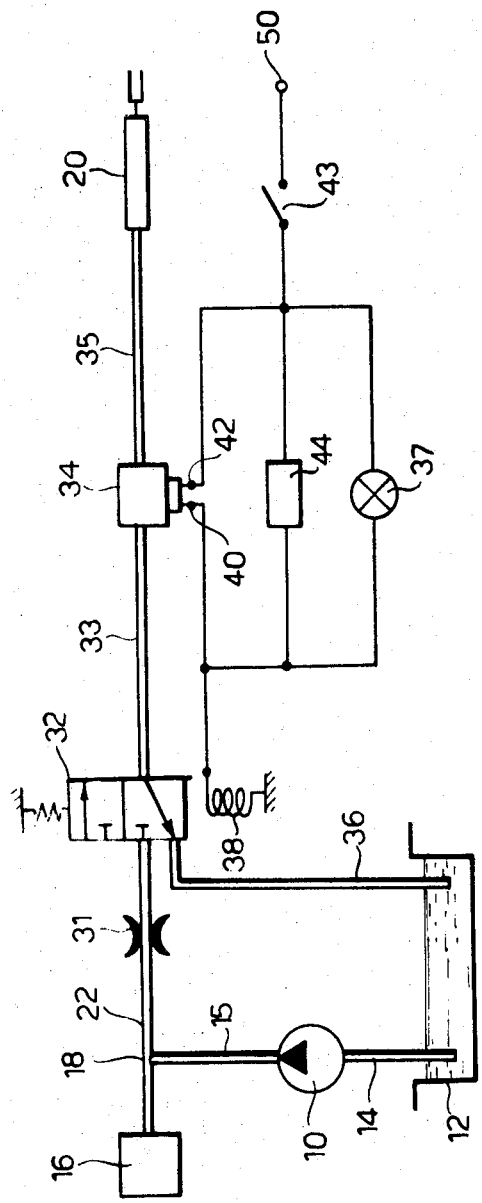

3,808,449

SAFETY DEVICE FOR PROTECTING HYDRAULIC CIRCUITS HAVING A BRANCH CIRCUIT

BACKGROUND OF THE INVENTION

The present invention relates to a device for the protection of hydraulic circuits from a failure in a branch circuit. The invention finds particular utility with respect to hydraulic braking circuits which have a branch from which auxiliary hydraulic devices are operated.

In many braking installations, particularly for lorries, it is convenient to use a branch of the hydraulic braking circuit for auxiliary services, for example, for a control cylinder for the braking motor.

In the event of damage to the above-mentioned auxiliary circuits the loss of fluid pressure can deleteriously affect the operation of the brakes, as it is not possible to control the anciliary installation with a controlled pressure valve, as is normally done, for example, in the case of pneumatic braking circuits. In the case of pneumatic circuits the operation of such a controlled valve in the event of a leak in the branch circuit does not jeopardize the operation of the main circuit as the compressor which generates pressure has an inexhaustible reserve of air in the atmosphere, while such operation is not possible in the case of hydraulic circuits because a leak in the branch circuit would inevitably entail a rapid loss of pressure and a total emptying of fluid from the tank.

OBJECT OF THE INVENTION

The object of this invention is to provide a device to protect hydraulic circuits against the effects of a failure in the auxiliary services, without the use of controlled pressure valves, thus avoiding the above-mentioned disadvantages thereof.

SUMMARY OF THE INVENTION

According to the present invention, there is provided a device for the protection of a main hydraulic circuit from a fault in an auxiliary branch circuit, characterised in that it comprises an electrovalve between the main circuit and the auxiliary circuit and normally connecting the auxiliary circuit to a reservoir of the main circuit and operable by a solenoid to connect the main circuit to the auxiliary circuit, the solenoid being connected to an electric control circuit comprising a source of electrical power, and a control switch in series with a circuit comprising a normally closed timer in parallel with a pressure controlled switch which is normally open and which is sensitive to the pressure in the auxiliary circuit to close when the pressure exceeds a predetermined threshold.

Embodiments of the invention can be formed in such a way that the driver can be warned of the existence of a fault in the auxiliary hydraulic device.

Various other features and advantages will become more apparent during the course of the following detailed description with reference to the drawing, which is given purely by way of example.

BRIEF DESCRIPTION OF THE DRAWING

The single drawing is a schematic circuit diagram showing both the hydraulic and the electrical parts of the circuit.

DESCRIPTION OF THE PREFERRED EMBODIMENT

Referring now to the drawing there is shown hydraulic pressure generator 10 which may be, for example, an hydraulic pump. The pump 10 draws fluid from a reservoir 12 through a conduit 14 and passes it under pressure to a conventional hydraulic braking installation schematically indicated 16 through a conduit 15.

To a point 18 of the conduit 15 there is connected a conduit 22 for an auxiliary device which may be, for example, on hydraulic cylinder 20 for the control of an hydraulic motor for the braking circuit. A constriction 31 is located in the conduit 22 between the junction 18 and solenoid operated valve 32 (hereinafter termed an "electrovalve") which normally connects a conduit 33 to a discharge conduit 36 which leads to the reservoir 12. When energised the electro-valve 32 allows communications between the constriction 31 and the conduit 33 which leads, via a pressure sensitive electrical switch 34 to the above-mentioned hydraulic cylinder 20 which in this embodiment is the auxiliary device fed from a branch of the braking circuit.

The pressure sensitive switch 34 connected between the electrovalve 32 and the cylinder 20 is calibrated to operate at a pressure which is lower than the normal operating pressure of the main circuit; for example its calibration pressure will be of the order of 30 kg/cm$^2$ for a maximum pressure in the main circuit in the region of 150 kg/cm$^2$. Two output terminals 40, 42 of the pressure switch 34 are normally open circuit, and they are connected in a short circuit when the pressure in the conduit 33 exceeds the calibration threshold of the pressure switch 34.

The output terminals 40, 42 are part of an electric energising circuit for a solenoid 38 which controls the electrovalve 32. This control circuit comprises a direct current source represented by the terminal 50 in the drawing, which may conveniently be the battery of the vehicle, which is connected to a control switch 43 operation of which initiates the operation of the auxiliary device and a timer 44 connected in parallel with a pilot lamp 37 and the pressure sensitive switch 34. The solenoid 38 is earthed to complete the circuit. The timer 44, for example, of a thermally sensitive type, is normally closed and opens when an electric current has been flowing through it for a short time, such as one second.

OPERATION

In normal conditions, when the auxiliary device is not in use the pump 10 feeds the braking installation 16 through the conduit 15, while the conduit 22 is closed by the valve 32. Any hydraulic fluid present in the conduits 33, 35 and in the hydraulic control cylinder 20 discharges through the valve 32 and the conduit 36 to the reservoir 12.

When the control switch 43 of the auxiliary service is closed, the current is fed to the solenoid 38 through the timer 44 which is initially closed, the pilot lamp 37 presents a much higher resistance than the timer 44 and the contents of the pressure switch 34 are open as the pressure yet in the auxiliary circuit is below the calibration threshold.

The electrovalve 32 is thus moved to its second position by the solenoid 38 so that it connects the conduit 22 to the conduit 33, excluding the discharge conduit 36, thereby operating the cylinder 20.

The pressure in the auxiliary circuit rapidly increases to a value above the calibration threshold of the pressure switch 34, thus closing the circuit between the terminals 40 and 42 in parallel with the timer 44 so that when after about one second the timer becomes open circuited, the solenoid 38 remains energised by the current passing through the circuit of the pressure switch 34.

During the whole of this process the pilot lamp 37 remains unlit since it is parallel with a short circuit, formed at first by the timer 44 and then by the pressure switch 34.

In the event of a fault occurring "downstream" of the electrovalve 32, that is, on the side of the electrovalve remote from the conduit 22, such that the hydraulic fluid leaks away, the stricture 31 causes a fall of pressure in the conduit 33 before any considerable loss of fluid from the mains circuit occurs, the pressure switch 34 opens when the pressure falls below its calibration threshold.

The electric connection between the source terminal 50 and the solenoid 38 is now only made through the pilot lamp 37 which thus lights up, but because of its high resistance, there is unsufficient current flow to energise the electrovalve 32 which therefore returns to its first position where the conduit 33 is connected to the reservoir 12 and the main installation is isolated from the auxiliary circuit and thus not affected by the fault. At the same time the lighting of the pilot lamp warns the driver that the auxiliary circuit is faulty. Where this fault warning to the driver is not required, the pilot lamp can be omitted without affecting the operation of the safety circuit.

If the fault has already occurred in the auxiliary circuit before the switch 43 is closed the pressure switch 34 will not close the circuit between the terminals 40 and 42 so that the auxiliary circuit will only be connected to the main circuit for the time of operation of the timer 44 before moving to the position where the lamp 37 is lit indicating a fault and the auxiliary circuit is isolated.

The loss of fluid will be minimal since it will take place through the constriction 31 and then only for the time for which the timer is open, that is of the order of one second.

Naturally the device, although described in its application to an hydraulic braking installation, can be applied in the same way to other types of hydraulic power circuits, having branches for auxiliary services.

I claim:

1. A safety device for a main hydraulic circuit having an auxiliary branch circuit, said device comprising:
   an electrovalve connected between said main hydraulic circuit and said auxiliary branch circuit,
   a reservoir in said main hydraulic circuit, said electrovalve normally connecting said auxiliary branch circuit to said reservoir and isolating said branch circuit from said main circuit,
   a solenoid controlling said electrovalve, said electrovalve connecting said main hydraulic circuit to said auxiliary branch circuit when said solenoid is energised,
   an electric control circuit for said solenoid, said control circuit comprising,
   electrical poser source means,
   first control switch means connected to said electrical power source means,
   a normally closed timer switch which opens when current has been flowing therethrough for a predetermined time interval,
   a normally open pressure sensitive switch, means connecting said pressure sensitive switch to said auxiliary branch hydraulic circuit, said pressure sensitive switch closing when the pressure in said auxiliary branch circuit exceeds a predetermined threshold pressure, said normally closed timer switch and said normally open pressure sensitive switch being connected in parallel with one another and in series with said control switch means and said solendoid.

2. The safety device of claim 1 wherein said threshold pressure of said pressure sensitive switch is substantially less than the normal operating pressure of said main hydraulic circuit.

3. The safety device of claim 1 wherein there is a constriction in said means connecting said main hydraulic circuit to said electrovalve.

4. The safety device of claim 1 wherein there is a pilot lamp connected in parallel with said timer switch, said pilot lamp having an electrical resistance which is high with respect to the electrical resistance of said timer switch.

5. The safety device of claim 1 wherein said main hydraulic circuit is in a hydraulic braking circuit of a motor vehicle.

* * * * *